United States Patent Office 3,316,301
Patented Apr. 25, 1967

3,316,301
METHOD OF PREPARING UNSYMMETRICAL DIALKYL HYDRAZINIUM PERCHLORATES AND FLUOROBORATES
Manfred Stammler, Carmichael, Calif., assignor to Aerojet-General Corporation, Azusa, Calif., a corporation of Ohio
No Drawing. Original application July 30, 1962, Ser. No. 214,448, now Patent No. 3,259,657, dated July 5, 1966. Divided and this application Oct. 18, 1965, Ser. No. 509,667
4 Claims. (Cl. 260—583)

This application is a division of Ser. No. 214,448, filed July 30, 1962, now Patent No. 3,259,657.

This invention relates to normal unsymmetrical dialkyl hydrazine compounds which have a tacky consistency and the ability of undergoing plastic deformation. More specifically, this invention relates to unsymmetrical dialkyl hydrazinium perchlorate and fluoroborate compounds and their method of preparation.

The object of this invention is to provide unsymmetrical dialkyl hydrazinium perchlorate and fluoroborate compounds. A further object is to provide a method for making these compounds. Additional objects will become apparent from reading the specification and claims which follow.

The compounds of my invention can be depicted as having the formula:

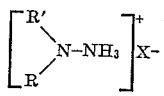

in which R and R' are lower dialkyl radicals containing up to about six carbon atoms each, and X is selected from the group consisting of the fluoroborate anion, $BF_4^-$, and the perchlorate anion, $ClO_4^-$. Preferred among my compounds are the compounds 1,1-dimethylhydrazinium fluoroborate, and 1,1-dimethylhydrazinium perchlorate.

My compounds are quite unique in that they have properties which are quite different from those exhibited by superficially similar compounds. Thus, my compounds have a tacky consistency and the ability to undergo plastic deformation.

As stated above, my invention also includes methods for forming my compounds. The first method is represented by the following general equation:

EQUATION I

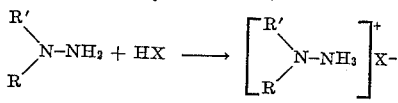

In the above equation R and R' are lower alkyl radicals containing up to about six carbon atoms and X represents either the perchlorate or fluoroborate anion. Thus, the compound HX represents either perchloric acid or fluoroboric acid.

In forming my compounds, either perchloric or fluoroboric acid is added to an unsymmetrical dialkyl hydrazine compound until the pH for the reaction mixture is about 4.5. Although not necessary, I prefer to employ in the reaction mixture a polar solvent which acts as a diluent in controlling the temperature of the reaction mixture during the course of the reaction. Preferably, an alcohol such as isopropyl alcohol or methanol is employed. I can, however, also employ water as the solvent.

The reaction is customarily performed at about room temperature and atmospheric pressure. Although not necessary, the reaction mixture can be agitated if desired.

My novel compounds as defined above are separated from the reaction mixture by conventional means such as, for example, crystallization followed by vacuum drying of the precipitated product.

A further method which can be employed in making my novel compounds is represented by the following general equation:

EQUATION II

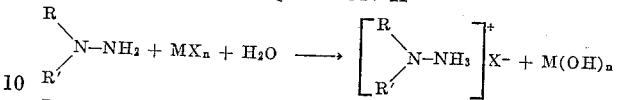

In the above equation, R, R', and X have the meaning set forth previously. M represents either the ammonium ion or an alkali or alkaline earth metal cation such as sodium, potassium, lithium, barium, strontium or calcium. $n$ is either one or two and corresponds with the valence of M. Preferably, M is a bivalent metal such as calcium, strontium or barium which forms insoluble hydroxide compounds. When the hydroxide $M(OH)_n$ formed during the course of the reaction is insoluble, it precipitates and thereby furnishes a driving force for the reaction.

The above reaction is customarily performed at about room temperature and atmospheric pressure. The reaction mixture can be agitated if desired. Preferably, the reaction is carried out in the presence of a polar solvent such as methanol, ethanol or water.

Still another method for forming my novel compounds is represented by the following general equation:

EQUATION III

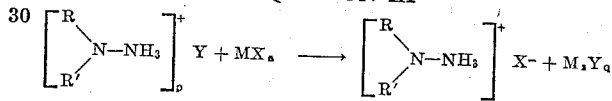

In the above equation R, R' and X have the meaning set forth previously. Y is an anion which is not the perchlorate or fluoroborate anion and which has a minus charge of either $-1$ or $-2$. $p$ is either one or two and corresponds with the minus charge on the anion Y. M is the ammonium ion or an alkali or alkaline earth metal cation having a plus charge of $+1$ or $+2$. $a$ is either one or two and corresponds with the positive charge on the cation M. $z$ and $q$ are both either one or two with the product of $x$ times the valence of M being equal to the product of $q$ times the valence of Y. $z$ and $q$ can be the same or different.

The above reaction is carried out in the presence of a polar solvent and preferably with agitation. The reaction occurs under normal conditions of temperature and pressure. The product is separated from the reaction mixture by normal means such as filtration and crystallization. Preferably the metal cation M is a bivalent metal such sa calcium, barium or strontium which forms an insoluble salt with the anion Y. When this occurs, the bi-product $M_zY_q$ precipitates from the reaction mixture and furnishes a driving force for the reaction. As an example, when M is barium and Y is a sulfate anion, the compound $M_zY_q$ is barium sulfate which is very insoluble in polar solvents and readily precipitates to furnish the driving force for the reaction.

To further illustrate my invention, there are presented the following examples in which all parts and percentages are by weight unless otherwise indicated.

*Example I*

To 2.31 cc. of unsymmetrical dimethylhydrazine (about 30 millimoles) were added 25 cc. of isopropyl alcohol. There was then added 2.22 cc. of seventy percent perchloric acid or about 30 millimoles. During the reaction, the reaction mixture was maintained at about 30°–40° C. by cooling the reaction vessel with ice water. After reaction had ceased, a portion of the solvent was removed by vacuum distillation until the total volume of the reaction product and remaining solvent had been reduced to about 10 cc. On cooling of the concentrated mixture, a precipitate was obtained. The precipitate was separated by filtration and was dried in a drying apparatus at about 68° C. under vacuum and over phosphorus pentoxide. On subjecting the dried product to analysis, it was found to be 1,1-dimethylhydrazinium perchlorate.

In performing the above reaction, I prefer to use a slight excess of perchloric acid since it decreases the solubility of the 1,1-dimethylhydrazinium perchlorate product and thereby aids in its recovery.

When Example I is repeated using 1,1-di-ethyl hydrazine, 1,1-dibutyl hydrazine or 1,1-dihexyl hydrazine in place of the 1,1-dimethyl hydrazine, the products 1,1-diethylhydrazinium perchlorate, 1,1 - dibutylhydrazinium perchlorate, and 1,1-dihexylhydrazinium perchlorate are obtained.

*Example II*

One mole of ammonium perchlorate and one mole of 1,1-dimethyl hydrazine were heated at reflux in methanol as solvent. After heating at reflux for one hour, there was obtained about a seventy percent conversion of ammonium perchlorate to 1,1-dimethylhydrazinium perchlorate. When the methanol solvent was distilled from the system, an additional ten percent ammonia was evolved thus giving an eighty percent conversion to 1,1-dimethylhydrazinium perchlorate. The material obtained was dissolved in a volume of methanol equal to about ten percent of the orginal methanol volume and was then neutralized to a pH of about 4.5. When the mixture was then cooled with ice water, a precipitate was obtained which was unsymmetrical dimethylhydrazinium perchlorate of at least ninety-five percent purity. If desired, additional purification may be obtained by recrystallizing the product from isopropyl alcohol.

When Example II is repeated using as the reactant perchlorate salts other than ammonium perchlorate, similar results are obtained. Thus, calcium perchlorate, sodium perchlorate, and lithium perchlorate all react with unsymmetrical dimethyl hydrazine to give the product 1,1-dimethylhydrazinium perchlorate. Likewise, these salts react with other unsymmetrical dialkyl hydrazines such as 1,1-dibutyl hydrazine, 1,1-diethyl hydrazine, and the like to give products which, in this case, are 1,1-dibutylhydrazinium perchlorate and 1,1-diethylhydrazinium perchlorate.

*Example III*

When Example I was repeated using fluoroboric acid in place of perchloric acid, there was obtained in good yield the compound 1,1-dimethylhydrazinium fluoroborate. On subjecting the product 1,1-dimethylhydrazinium fluoroborate to analysis, values were obtained which were in satisfactory agreement with the calculated values predicted from the structure of the compound.

When Example III is repeated using 1,1-diethyl hydrazine, 1,1-dibutyl hydrazine, or 1,1-di-n-propyl hydrazine in place of the 1,1-dimethyl hydrazine, the compounds 1,1-diethylhydrazinium fluoroborate, 1,1-dibutylhydrazinium fluoroborate, and 1,1-di-n-propylhydrazinium fluoroborate are obtained.

*Example IV*

One mole of 1,1-dimethyl hydrazine is added to an alcoholic solution of one mole of barium perchlorate and two moles of water. The reaction mixture is agitated at room temperature. After reaction ceases, the barium hydroxide which precipitates during the course of the reaction is separated from the reaction mixture by filtration. The filtrate is then heated under reduced pressures until its total volume is approximately one-tenth of its original volume. The concentrated solution is then cooled and the product 1,1-dimethylhydrazinium perchlorate precipitates. The precipitate is then dried to give essentially pure 1,1-dimethylhydrazinium perchlorate.

*Example V*

An alcoholic solution of one mole of bis(1,1-dimethylhydrazinium) sulfate is added to one mole of barium perchlorate with agitation of the reaction mixture. When reaction ceases, the barium sulfate precipitate is separated from the reaction mixture by filtration. The filtrate is then heated at reduced pressure until its volume is reduced to approximately one-tenth of its original volume. The concentrated filtrate is then cooled and a precipitate is formed. On drying of the precipitate, there is obtained essentially pure 1,1-dimethylhydrazinium perchlorate in good yield.

When Example V is repeated using sodium perchlorate, calcium fluoroborate, or strontium perchlorate in place of the barium perchlorate, the compounds 1,1-dimethylhydrazinium perchlorate, 1,1-dimethylhydrazinium fluoroborate, and 1,1-dimethylhydrazinium perchlorate are obtained. Similarly, when bis(1,1 - dihexylhydrazinium) sulfate and 1,1-diethylhydrazinium chloride are employed in Example V in place of bis(1,1-dimethylhydrazinium) sulfate, the compounds 1,1-dihexylhydrazinium perchlorate and 1,1-diethylhydrazinium perchlorate are obtained.

*Example VI*

Using the general conditions employed in Example I, one mole of unsymmetrical dimethyl hydrazine is reacted with a mixture comprising 0.5 mole of perchloric acid and 0.5 mole of fluoroboric acid. There is obtained a homogeneous mixture of 1,1-dimethylhydrazinium perchlorate and 1,1-dimethylhydrazinium fluoroborate.

As set forth above, my compounds are quite unique in that they have a tacky consistency and the ability of undergoing plastic deformation. Although not entirely certain as to why this is so, it is believed that my compounds have a unique crystalline configuration which is quite different than the crystalline configuration of superficially similar compounds such as 1,1-dimethylhydrazinium sulfate and 1,1-dimethylhydrazinium chloride. Certain of my compounds, namely 1,1-dimethylhydrazinium perchlorate and 1,1-dimethylhydrazinium fluoroborate, were subjected to X-ray studies. The dimension of the unit cell for 1,1-dimethylhydrazinium perchlorate was 5.56 angstrom units with one molecule per unit cell, an X-ray density ($d_x$) of 1.551 grams per cc. and a unit cell volume of 171.86 cubic angstrom units. The pycnometric density ($d_o$) of 1,1-dimethylhydrazinium perchlorate was found to be 1.435 grams per cc.

The X-ray defraction pattern for 1,1-dimethylhydrazinium fluoroborate was quite similar to that obtained for 1,1-dimethylhydrazinium perchlorate. The unit cell dimensions for 1,1-dimethylhydrazinium fluoroborate were 5.57 angstrom units with a cell volume of 172.81 cubic angstrom units, a pycnometric density of 1.407 grams per cc. and an X-ray density of 1.421 grams per cc.

My novel compounds in which X is the perchlorate anion are excellent explosives. As set forth previously, my compounds have a tacky consistency and the ability of undergoing plastic deformation. Thus, my novel perchlorate compounds can be employed as plastic explosives.

The burning rates of my perchlorate compounds can be moderated by mixing them with my fluoroborate compounds which do not have high burning rates. This is accomplished most conveniently by reacting a mixture of perchloric and fluoroboric acid with an unsymmetrical dialkyl compound

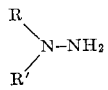

as defined previously. The product obtained is a homogeneous mixture of my perchlorate and fluoroborate compounds. By varying the ratio of the perchlorate acid to fluoroboric acid, I can obtain a whole range of mixtures each having a different burning rate.

My compounds in which X is a fluoroborate anion can be employed as gas generating compounds. When so employed, the compounds are heated above about 190° C., where they are decomposed to form gases which can be employed for actuating values, etc.

Further, my novel compounds in which X is a fluoroborate anion have high electrical conductivity and could be employed as semi-conductor materials.

Having described my novel compounds, their methods of preparation and their several utilities, I desire to be limited only within the lawful scope of the appended claims.

I claim:
1. Process comprising reacting an unsymmetrical dialkyl hydrazine compound having the formula

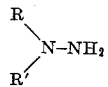

wherein R and R' are lower alkyl groups containing up to about six carbon atoms, with a compound having the formula $MX_n$, wherein M is a cation selected from the group consisting of ammonium, alkali metal and alkaline earth metal cations, X is an anion selected from the group consisting of fluoroborate and perchlorate, and $n$ is an integer selected from the group consisting of one and two with $n$ corresponding with the valence of M, said reaction being carried out in the presence of water.

2. The process of claim 1 wherein M is a bivalent alkaline earth metal which forms insoluble hydroxide compounds.

3. The process of claim 1 wherein the reaction is carried out in the presence of a polar solvent.

4. The process of claim 3 wherein M is barium.

References Cited by the Examiner

Omietanski, G. M., et al.: J. Am. Chem. Soc., 78 (6), p. 1212, Mar. 20, 1956.

CHARLES B. PARKER, *Primary Examiner.*

RICHARD L. RAYMOND, *Assistant Examiner.*